United States Patent
Dyer

[11] Patent Number: 5,570,905
[45] Date of Patent: Nov. 5, 1996

[54] AIRBAG TETHER ATTACHMENT

[75] Inventor: David J. Dyer, Kaysville, Utah

[73] Assignee: Morton International, Inc., Chicago, Ill.

[21] Appl. No.: 412,055

[22] Filed: Mar. 28, 1995

[51] Int. Cl.$^6$ ............................................. B60R 21/20
[52] U.S. Cl. ............................. 280/743.2; 280/743.1
[58] Field of Search ........................... 280/743.2, 743.1, 280/728.2

[56] References Cited

U.S. PATENT DOCUMENTS

| | | | |
|---|---|---|---|
| 3,514,125 | 6/1968 | Nemecek | 280/150 |
| 4,286,954 | 9/1981 | McArthur et al. | 493/244 |
| 4,842,300 | 6/1989 | Ziomek et al. | 280/732 |
| 4,941,678 | 7/1990 | Lauritzen et al. | 280/732 |
| 4,986,569 | 1/1991 | Bruton | 280/743 |
| 5,044,663 | 9/1991 | Seizert | 280/730 |
| 5,072,967 | 12/1991 | Batchelder et al. | 280/732 |
| 5,087,071 | 2/1992 | Wallner et al. | 280/743 |
| 5,131,677 | 7/1992 | Horiuchi et al. | 280/731 |
| 5,141,247 | 8/1992 | Barth | 280/728 |
| 5,184,843 | 2/1993 | Berger et al. | 280/728 |
| 5,186,489 | 2/1993 | Imai | 280/728 |
| 5,186,492 | 2/1993 | Wright et al. | 280/743 |
| 5,263,739 | 11/1993 | Webber et al. | 280/728.2 |
| 5,306,043 | 4/1994 | Mihm et al. | 280/743.2 |
| 5,332,257 | 7/1994 | Rogers et al. | 280/728.2 |
| 5,344,182 | 9/1994 | Lauritzen et al. | 280/728 A |
| 5,362,101 | 11/1994 | Sugiura et al. | 280/743.2 |
| 5,454,588 | 10/1995 | Rose | 280/728.2 |

FOREIGN PATENT DOCUMENTS

| | | | |
|---|---|---|---|
| 602796A2 | 6/1994 | European Pat. Off. | 280/728.2 |
| 4139483 | 6/1992 | Germany | 280/728.2 |
| 3-136942 | 6/1991 | Japan | 280/743.1 |
| 5-201301 | 8/1993 | Japan | 280/743.2 |

*Primary Examiner*—Eric D. Culbreth
*Attorney, Agent, or Firm*—George W. Rauchfuss, Jr.; Gerald K. White

[57] ABSTRACT

An inflatable airbag which provides for vehicle occupant restraint when inflated has a tether inside said airbag. One end of the tether is attached to the airbag wall at a point or line away from the mouth of the airbag and the opposite end of the tether is fastened to a canister by means of a retaining rod housed inside a hemmed loop at the end of the tether. The retaining rod inside the hemmed loop is retained in a slotted rail or channel on the canister. Stress in the tether is transmitted directly from the tether to the retaining rod and thence to the canister.

18 Claims, 3 Drawing Sheets

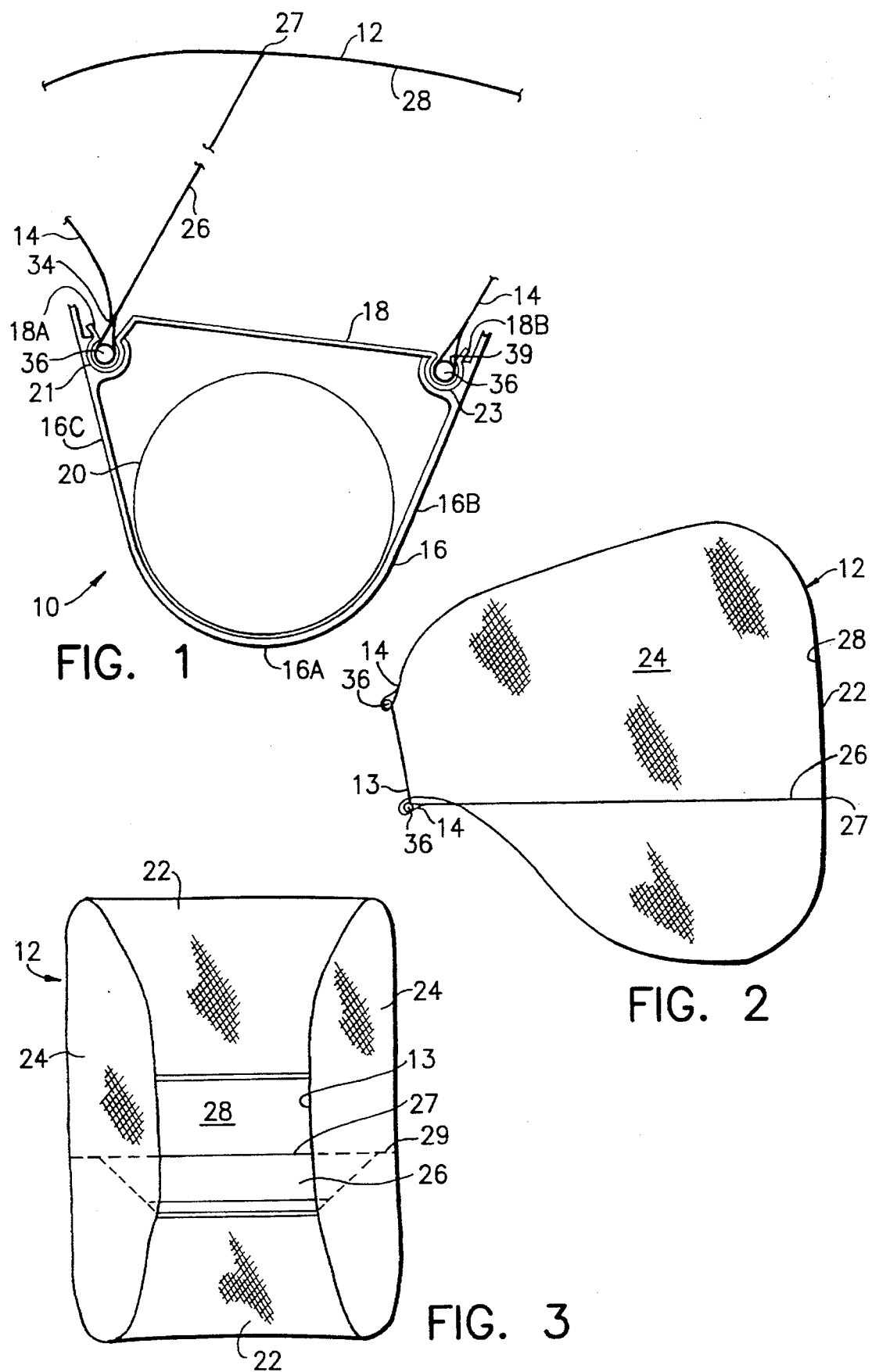

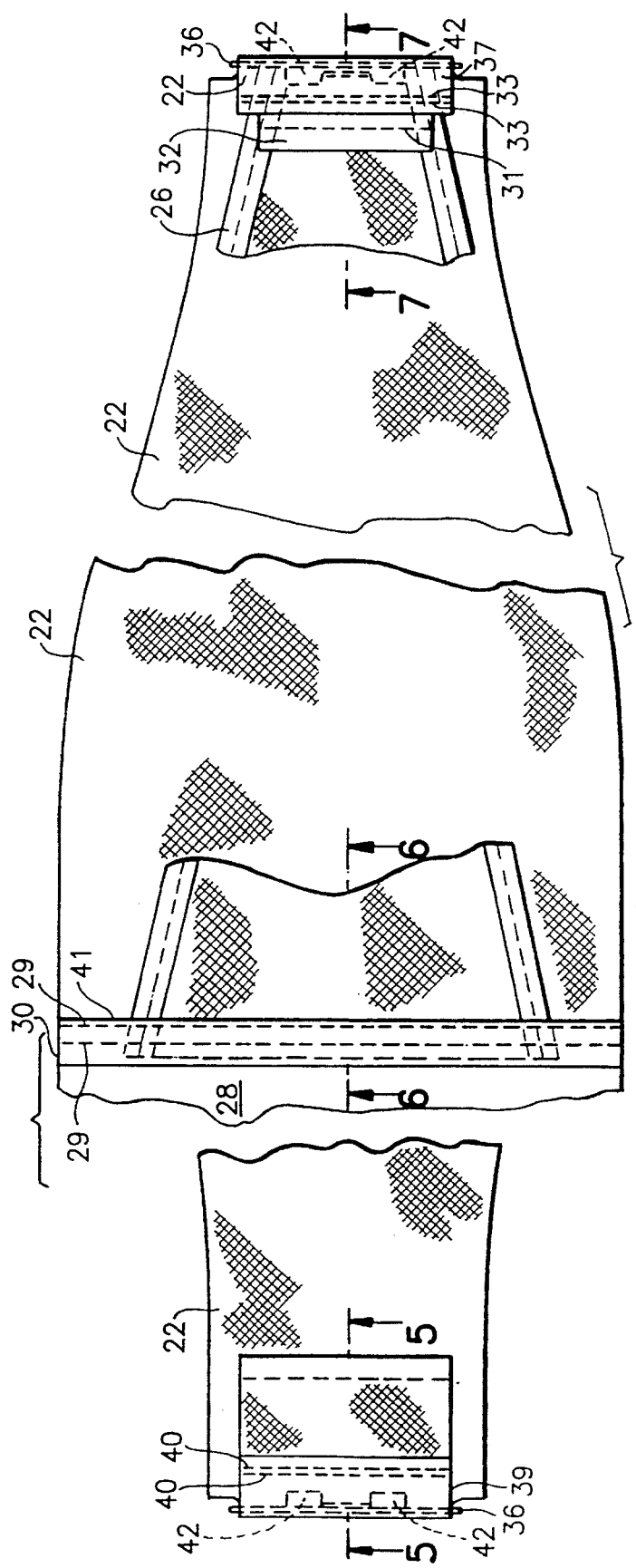

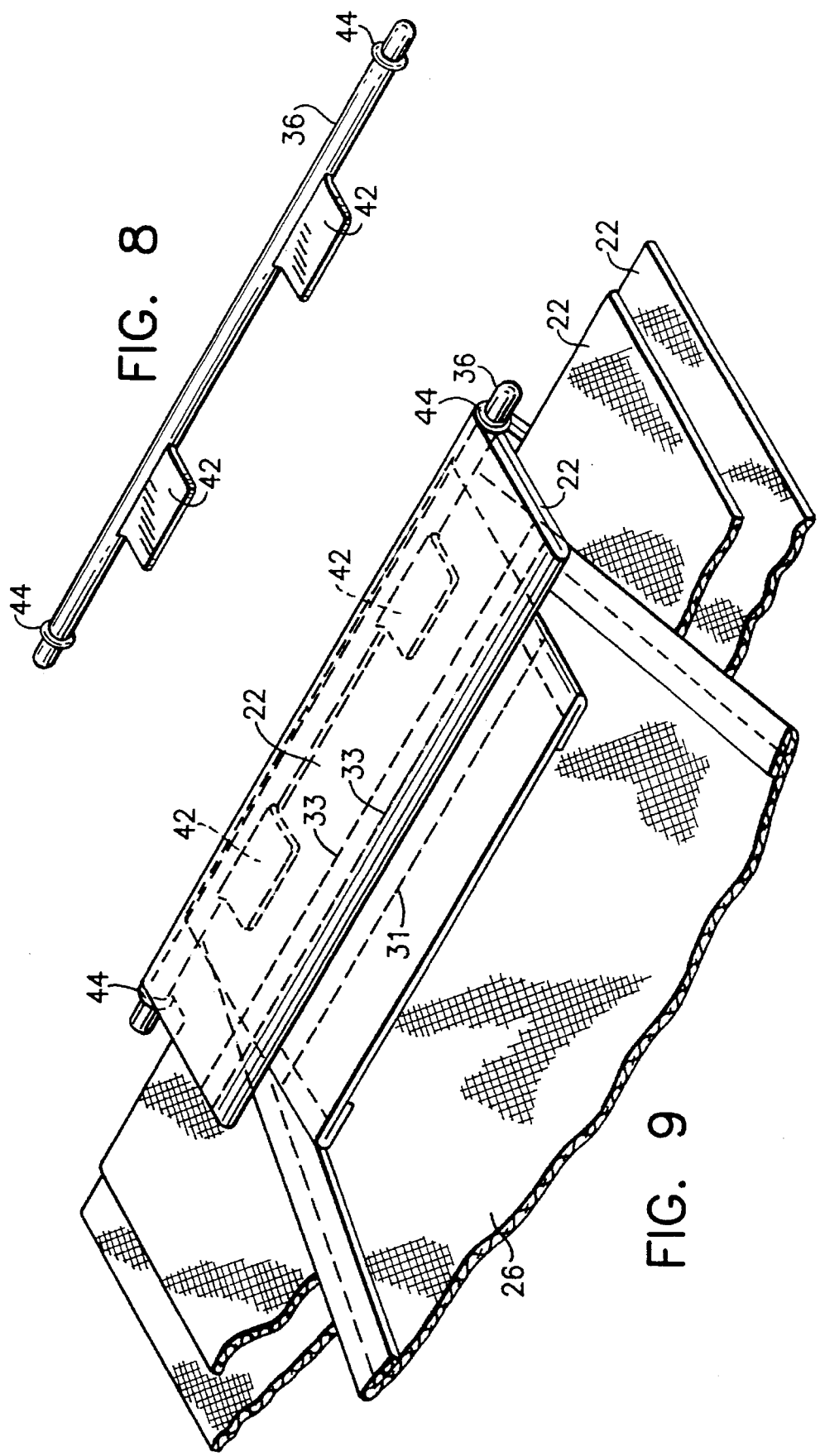

AIRBAG TETHER ATTACHMENT

FIELD OF THE INVENTION

The invention relates to improvements in airbag restraint systems for automobile passenger safety, and more particularly to improvements in the structure of airbags used in such systems.

BACKGROUND OF THE INVENTION

Airbag modules currently used in automobiles comprise an inflator for rapid generation of gas, activated upon rapid deceleration of the automobile as in a collision, a canister which contains the inflator and transmits gas from the inflator to the airbag, and an airbag which will be deployed and inflated by gas issuing from the inflator. The airbag, when inflated, provides a cushion in front of a vehicle occupant to arrest forward motion of the driver or passenger in a collision.

The shape of the inflated cushion will be determined primarily by the shape of walls of the airbag but may be further affected by the use of one or more tethers inside the airbag. Tethers may be used to alter the shape of an inflated cushion or for relieving excessive stress in an airbag wall at a point or line where the outer end of the tether is attached to the airbag.

Tethers may also be used for restraining or limiting the extension of the airbag at points where tethers are attached to the airbag walls. One purpose for the use of tethers is to prevent a "slapping" motion of the airbag at its outer end. When a top mounted passenger side airbag is being deployed into the passenger compartment, before it is fully inflated, the outer end of the airbag may extend outward beyond its normal reach for an instant before the airbag assumes its fully inflated shape. This may cause the outermost end to slap an occupant in the vehicle. The use of tethers can prevent such over extension at the outer end of the airbag and thus prevent such slapping of the occupant.

In many airbag constructions that use tethers, one end of the tether is anchored by attachment to the airbag fabric at or near the mouth or throat of the airbag fabric. At its other end the tether will be attached at a selected point or line to the inner wall of the airbag. A conventional means for attaching the tether inside the airbag has been to sew the tether at each of its ends to the airbag fabric wall at selected points. However, this anchoring of the one end of the tether to the area at, near or around the mouth of the airbag, such as shown in U.S. Pat. No. 5,044,663, can cause undue stress in the airbag and the airbag fabric may rip if the stress becomes too great.

U.S. Pat. No. 4,941,678 described an airbag structure in which a tether at the throat of the airbag and the airbag wall were both sewn to a band having a continuous loop which encircled a retaining ring held by the canister. The present invention has the advantage that the end of the tether itself encircles a retaining rod held to the canister so that stress in the tether is transmitted directly from the tether to the retaining rod without an intervening member encircling the retaining rod with the end of the tether held only by stitching the tether to such intervening member.

In some prior art structures the end of the airbag wall, but not the end of the tether, would extend around a retaining rod to fasten the airbag to the canister. In those constructions, stress from the tether was transmitted to the canister only through a panel of the airbag to which the end of the tether was sewn and the airbag in turn transmitted such stress to the canister.

BRIEF DESCRIPTION OF THE INVENTION

The invention provides an airbag construction with one end of a tether fastened at its end nearest the mouth or throat of an airbag by means that will provide a stronger fastening than merely stitching that end of the tether to the area around the mouth or throat of the airbag.

In the present invention one end of a tether, the end nearest to the mouth or throat of the airbag, is retained by a retaining rod which is held by the canister. Stress in the tether is transmitted directly from the tether to the retaining rod and thence to the canister, without transmitting such stress through the airbag wall fabric to which the end of the tether would otherwise be attached. This arrangement anchors the tether to the canister more securely than prior art constructions in which the end of the tether at the mouth or throat of the airbag was held by sewing that end of the tether to the airbag wall.

Some preferred embodiments of the invention will be described in more detail with reference to the Drawings.

BRIEF DESCRIPTION OF THE DRAWINGS

The invention is illustrated in the accompanying drawings in which:

FIG. 1 is a side view of a tethered inflated airbag fastened to a diffuser plate member of a reaction canister in accordance with this invention.

FIGS. 2 and 3, respectively are side and front views of an inflated airbag of this invention.

FIG. 4 is a plan view of the main panel of the airbag shown in FIGS. 2 and 3, with portions cut away, illustrating the structure of hems at the ends of the main airbag panel and a connection at ends of a tether inside the airbag.

FIG. 5 is an enlarged cross section along line 5—5 in FIG. 4 showing detail of the hem at one end of the main airbag panel.

FIG. 6 is an enlarged cross section along line 6—6 in FIG. 4 showing detail of an inward tuck in the main panel of the airbag and the connection of a tether to that inward tuck.

FIG. 7 is an enlarged cross section along line 7—7 in FIG. 4 showing detail of hems at ends of the main airbag panel and the tether.

FIG. 8 is a perspective view of a retaining rod suitable for use with the invention.

FIG. 9 is an enlarged perspective view of one end of the main panel of the airbag and one end of the tether, such as shown in FIG. 7, illustrating the hems at the ends of those members and a retaining rod held inside those hems.

DETAILED DESCRIPTION OF THE INVENTION

An airbag module embodying the invention, indicated generally by the reference numeral 10, is illustrated in the drawings FIGS. 1 to 3. FIG. 1 is a side view of such an airbag module 10 with certain standard elements, not necessary for an understanding of this invention, omitted or removed for purposes of illustrating the invention. Such an airbag module is normally positioned behind an instrument panel or deployment door in a conventional manner. The airbag module 10 includes a trough-shaped reaction canister 16 housing an inflator 20 in the bottom 16A of the canister, a diffuser plate 18 and an inflatable airbag 12 (shown in its deployed and inflated states for the purpose of showing the invention more clearly). Normally the airbag 12 is in its collapsed or folded, inactive state in the airbag module 10.

As shown in FIGS. 2 and 3, the airbag 12 is formed from a main fabric panel 22 and side panels 24 which are joined at their peripheral edges, generally by sewing the edges together, and the airbag is provided with an open mouth 13 for entry of inflation gas from gas outlet ports (not shown) in the inflator 20 after diffusion of the inflation gas through diffuser plate 18. The reaction canister 16 can be an extruded aluminum housing of the type disclosed in the aforementioned U.S. Pat. No. 4,941,678 and having a rounded bottom 16A and opposed sidewalls 16B and 16C extending therefrom. Canister housing 16 is provided with a slotted mounting channels 21 and 23 on the inner surface of each of its sidewalls 16B and 16C for receiving U-shaped slotted rails 18A and 18B on peripheral edges of diffuser plate 18. The U-shaped slotted rails 18A and 18B of diffuser plate 18 are designed and sized to slide into slotted mounting channels 21 and 23, respectively, from the ends of said channels. Once end walls (not shown) are secured to the reaction canister housing sidewalls 16B and 16C U-shaped slotted rails 18A and 18B are retained in the slotted channels 21 and 23 since the U-shaped rails are larger in diameter then the width of the slot in the slotted mounting channels.

The airbag 12 is provided with at least one fabric tether 26 joined at its outer end 27 to the inner surface 28 of main fabric panel 22, such as by sewn seam 29, at a point or along a line at or adjacent the outermost reach of said main fabric panel when said airbag is inflated. The inner end 32 of tether 26 is doubled back on itself and joined together, such as by a sewn seam 31, to form a hemmed loop 34 for receiving a retaining rod 36. Loop 34 of inner end 32 of tether 26 is placed inside a main panel hemmed loop 37 formed by doubling back on itself one end of main panel 22 of airbag 12 at the marginal edge 14 of said main panel at airbag mouth 13. Loop 37 is secured by means of sewn seams 33. The result is a tether hemmed loop 34 inside or encircled by a main panel hemmed loop 37. When retaining rod 36 is place into tether loop 34, or has been placed therein before forming said tether loop, the resulting structure is ready to be slid into a U-shaped slotted rail 18A on diffuser plate 18 such that tether loop 34 and main panel loop 37 are securely retained in the slotted rail 18A and said slotted rail is securely retained in slotted mounting channel 21.

It will be appreciated that although this invention is illustrated with a single tether 26 mounted in one of said U-shaped slotted rails 18A and slotted mounting channel 21, a second tether similar to tether 26 could be employed and similarly formed into a tether loop 34 at its inner end around a retaining rod 36 and enclosed with a main panel loop 37 formed by doubling back on itself the other end of the main panel 22 at a marginal edge 14 of said main panel at the airbag mouth 13 and this arrangement slid into the other U-shaped slotted rail 18B and said slotted rail secured in slotted mounting channel 23. The outer end of said second tether would be joined to inner surface 28 of main panel 22 in a manner similar to that described for the outer end 27 of first tether 26.

When only one tether is employed as shown in FIGS. 1 to 3 the other end of main panel 22 is simply doubled back on itself and sewn together by seams 40 as shown in FIG. 5 to form a second main panel loop 39 about a retaining rod 36. This arrangement of looped main fabric panel 39 about retaining rod 36 (i.e. without a tether) as shown in FIG. 5 is slid into U-shaped slotted rail 18B and the rail slid into slotted mounting channel 23 on canister sidewall 16B, as shown in FIG. 1.

A preferred form of attaching the outer end 27 of tether 26 to inner surface 28 of main fabric panel 22 of airbag 12 is to sew the outer end of the tether into a fold or tuck 41 of main panel 22 by stitching the outer end 27 between the fold or tuck by sewn seams 29, as shown in FIG. 6.

In a preferred form of this invention, as illustrated in FIGS. 4 to 7 and 9, the loops and tuck or fold are formed by doubling back a dual layer of the main panel or tether ends before stitching to form the loop or tuck in order to provide a stronger bond in the arrangement of this invention. Further, as illustrated in FIGS. 4, 7 and 9, after once doubling back one end of the main panel 22, the inner end 32 of tether 26 and that end of the main panel are laid together, doubled back together and sewn down to make the tether loop 34 and main panel loop 37. Then a single retaining rod 36 can be employed in tether loop 34 for retaining both the mouth end of the main panel 22 and the inner end 32 of the tether 26 in the U-shaped slotted rail 18A in slotted mounting channel 21 of reaction canister 16. In this way the tether 26 is securely retained by the reaction canister 16 rather than by the airbag fabric as in the prior art constructions and undue stress on the airbag fabric producing rips in the airbag fabric is thereby avoided or substantially eliminated.

Although it is possible to use any suitably sized and shaped retaining rod 36 for retaining loops 34 and 37 in the U-shaped slotted rails 18A and 18B, it is preferred to use a retaining rod of the type shown in FIG. 8. Such a retaining rod 36 has one or more, preferably at least two, substantially planar retaining ribs 42 extending longitudinally along and radially outward from the rod. The ribs 42 are generally substantially rectangular in shape. As shown in FIGS. 4, 5, 7 and 9, these retaining ribs are placed between the stitched layers of the tether 26 or main airbag panel 22 for providing additional stability to the retaining structure. The retaining rods 36 are also preferably provided with a pair of spaced, enlarged discs or keeper rings 44 which are placed adjacent ends of the rods to prevent the rods from sliding lengthwise in the loops 34 and 37 or in the U-shaped slotted rails 18A and 18B in which the rod is to be held or retained. The slot along the length of rails 18A and 18B is narrower than the diameter of rod 36 so that the rod inside the rails cannot pass through the slot. The slot will be wide enough however so that the hemmed layers of fabric of main panel 22 and tether 26 can pass through the slot. As the airbag 12 is inflated, stresses in airbag 12 and tether 26 are transmitted to the retaining rods 36 held inside the U-shaped slotted rails 18A and 18B and slotted mounting channels 21 and 23. By this the tether stresses are transmitted to the canister 16 rather than to the fabric of the airbag 12.

With the foregoing description of the invention, those skilled in the art will appreciate that modifications may be made to the invention without departing from the spirit thereof. Therefore, it is not intended that the scope of the invention be limited to the specific embodiments illustrated and described.

What is claimed is:

1. An inflatable airbag for use in an airbag module comprising a canister containing an inflator for generating inflation gas for inflating the airbag, said airbag comprising a plurality of fabric panels joined to form walls of an inflatable airbag, peripheral edges of said fabric panels defining an airbag mouth for entry of said inflation gas, means at said peripheral edges for attaching the mouth of said airbag to the canister, said airbag further comprising a tether inside said inflatable airbag, said tether having opposed first and second ends, said first end of said tether attached to one of said fabric panels at a point away from the mouth of the airbag, said second end of said tether defining a loop housing a retaining rod having at least one substantially planar retaining rib extending longitudinally along and radially outward from said retaining rod, said second end of said tether and said retaining rod retainable in a retaining rod-receiving and retaining means on said canister.

2. An airbag as defined in claim 1 wherein said second end of said tether comprises a hemmed loop housing said retaining rod, said hemmed loop of said tether and said retaining rod receivable in and retainable in a U-shaped slotted rail of said canister.

3. An airbag as defined in claim 2 wherein said means at said peripheral edges of said fabric panels for attaching the mouth of the airbag to the canister comprises a hemmed loop of fabric panel enveloping the hemmed loop of said tether whereby the hemmed loop of the airbag fabric panel, the hemmed loop of the second end of said tether and the retaining rod are receivable in and retainable in said U-shaped slotted rail.

4. An airbag as defined in claim 3 wherein said plurality of fabric panels comprises a main fabric panel and two sidewall fabric panels, the first end of said tether attached to said main fabric panel along a line adjacent an outermost reach of said main fabric panel when said airbag is inflated.

5. An inflatable airbag as defined in claim 4 wherein the attachment of the first end of the tether to the main fabric panel comprises the first end of said tether secured in a folded tuck in the main fabric panel.

6. An inflatable airbag as defined in claim 5 wherein said retaining rod has a plurality of substantially planar retaining ribs extending longitudinally along and radially outward from said retaining rod and an enlarged disc adjacent each end of said retaining rod.

7. An inflatable airbag for use in an airbag module comprising a trough-shaped canister having a bottom and opposed sidewalls extending therefrom containing an inflator for generating inflation gas for inflating the airbag, said inflatable airbag comprising a main fabric panel and two sidewall fabric panels, longitudinal peripheral edges of said main panel joined together with peripheral edges of said sidewall panels to form an inflatable airbag having a mouth for receiving said inflation gas, said inflatable airbag further comprising at least one tether inside said airbag, said at least one tether having opposed first and second ends, said first end of said tether attached to an inner surface of said main fabric panel along a line adjacent an outermost reach of said main fabric panel when said airbag is inflated, said second end of said tether comprises a closed loop housing a retaining rod, a lateral peripheral edge of said main fabric panel adjacent the mouth of said airbag doubled back on itself and forming a second loop encircling the closed loop of said tether housing the retaining rod, said second loop being stitched to the closed loop of the tether whereby the loop of the main fabric panel, the closed loop of the tether and the retaining rod are retainable as an integral unit in a slotted mounting channel on a sidewall of the canister.

8. An inflatable airbag as defined in claim 7 wherein the attachment of the first end of the tether to the main fabric panel comprises the first end of said tether secured in a folded tuck in the main fabric panel.

9. An airbag module for use as an occupant restraint in a motor vehicle, the airbag module comprising:
  a trough-shaped reaction canister having a bottom and opposed sidewalls extending therefrom, each of said sidewalls having slotted mounting channels on an inner surface thereof;
  an inflator housed within said reaction canister bottom for generating inflation gases;
  a diffuser plate having U-shaped slotted rails on opposing longitudinal edges thereof, said slotted rails received and retained within said slotted mounting channels;
  an inflatable airbag comprising a plurality of fabric panels joined to form an inflatable airbag having a mouth formed by peripheral edges of said fabric panels, for receiving inflation gases from said inflator, two opposed edges of said mouth retained within said U-shaped slotted rails;
  said airbag further comprising a tether inside said inflatable airbag, said tether having opposed first and second ends, said first end of said tether attached to one of said fabric panels at a point away from the mouth of the airbag, said second end of said tether comprising a loop housing a retaining rod having at least one substantially planar retaining rib extending longitudinally along and radially outward from said retaining rod, said second end of said tether and said retaining rod received in and retained by one of said U-shaped slotted rails.

10. An airbag module as defined by claim 9 wherein said plurality of fabric panels comprise a main fabric panel and two sidewall fabric panels, peripheral edges of said main and sidewall panels forming said mouth and wherein the two opposed edges of said mouth retained within the U-shaped slotted rails comprise the peripheral edges of said main fabric panel formed as hemmed main panel loops, said second end of said tether comprises a hemmed tether loop with one of said hemmed main panel loops encircling said hemmed tether loop whereby said retaining rod housed in said second end of said tether retains both the hemmed main panel loop and the hemmed tether loop in one of said U-shaped slotted rails; the other hemmed main panel loop housing a second retaining rod, and said other hemmed main panel loop and, second retaining rod being received in and retained by the other of said U-shaped slotted rails.

11. An airbag module as defined in claim 10 wherein the attachment of the first end of the tether to the main fabric panel comprises the first end of said tether secured in a folded tuck in the main fabric panel.

12. An airbag module as defined in claim 11 wherein each of said retaining rods has a plurality of substantially planar retaining ribs extending longitudinally along and radially outward from each said retaining rod and an enlarged disc adjacent each end of each of said retaining rods.

13. An airbag module as defined in claim 9 wherein the attachment of the first end of the tether to the main fabric panel comprises the first end of said tether secured in a folded tuck in the main fabric panel.

14. An airbag module as defined in claim 13 wherein said retaining rod has a plurality of substantially planar retaining ribs extending longitudinally along and radially outward from said retaining rod and an enlarged disc adjacent each end of said retaining rod.

15. An inflatable airbag as defined in claim 7 wherein said retaining rod has at least one substantially planar retaining rib extending longitudinally along and radially outward from said retaining rod.

16. An inflatable airbag as defined in claim 15 wherein said retaining rod has a plurality of said substantially planar retaining ribs extending longitudinally along and radially outward from said retaining rod.

17. An inflatable airbag as defined in claim 16 wherein said retaining rod has an enlarged disc adjacent each end of said retaining rod.

18. An inflatable airbag as defined in claim 15 wherein said retaining rod has an enlarged disc adjacent each end of said retaining rod.

* * * * *

UNITED STATES PATENT AND TRADEMARK OFFICE
CERTIFICATE OF CORRECTION

PATENT NO. : 5,570,905
DATED : November 5, 1996
INVENTOR(S) : David J. Dyer

It is certified that error appears in the above-indentified patent and that said Letters Patent is hereby corrected as shown below:

At column 5, line 50, "comprises a closed loop" should be --comprising a closed loop--.

At column 5, line 53, "loop encircling" should be --loop comprising four thicknesses of said main panel encircling--.

Signed and Sealed this

Fifth Day of August, 1997

Attest:

BRUCE LEHMAN

Attesting Officer

Commissioner of Patents and Trademarks